Dec. 7, 1926.  
L. HOLLAND-LETZ  
1,609,718  
GRINDING BURRS  
Filed April 6, 1925   2 Sheets-Sheet 1
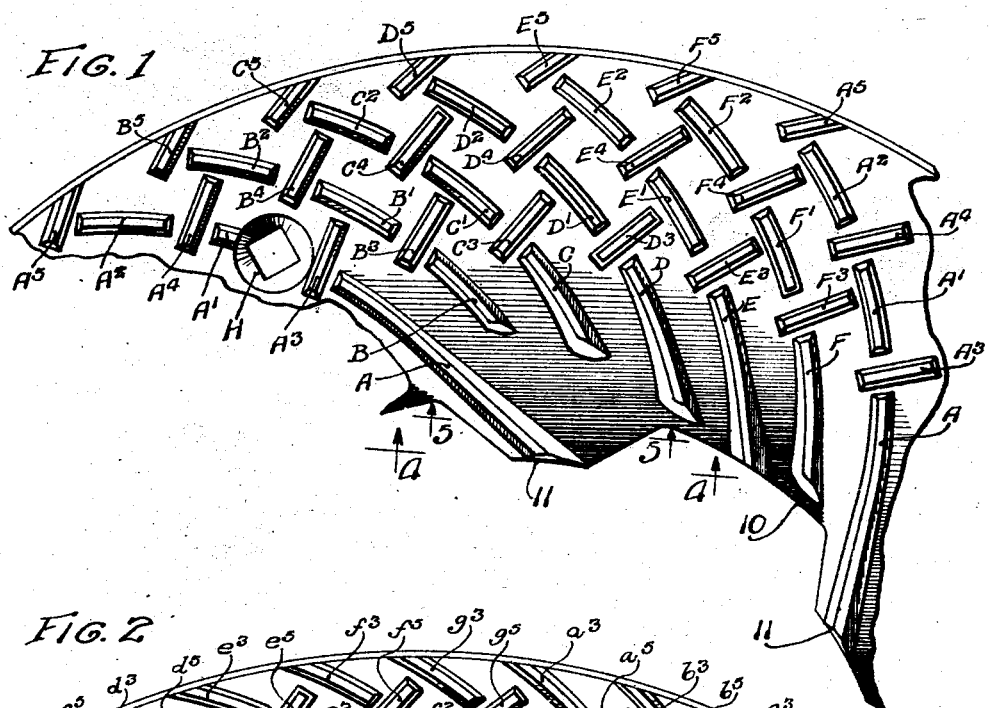
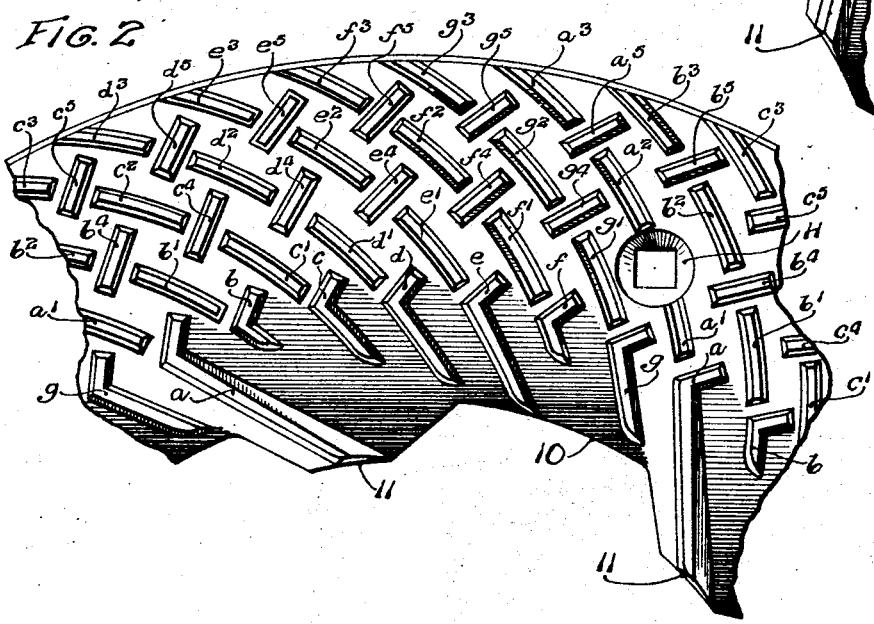
INVENTOR:  
Ludwig Holland-Letz  
BY John Howard McElroy  
HIS ATTY.

Dec. 7, 1926.
L. HOLLAND-LETZ
GRINDING BURRS
Filed April 6, 1925    2 Sheets-Sheet 2
1,609,718
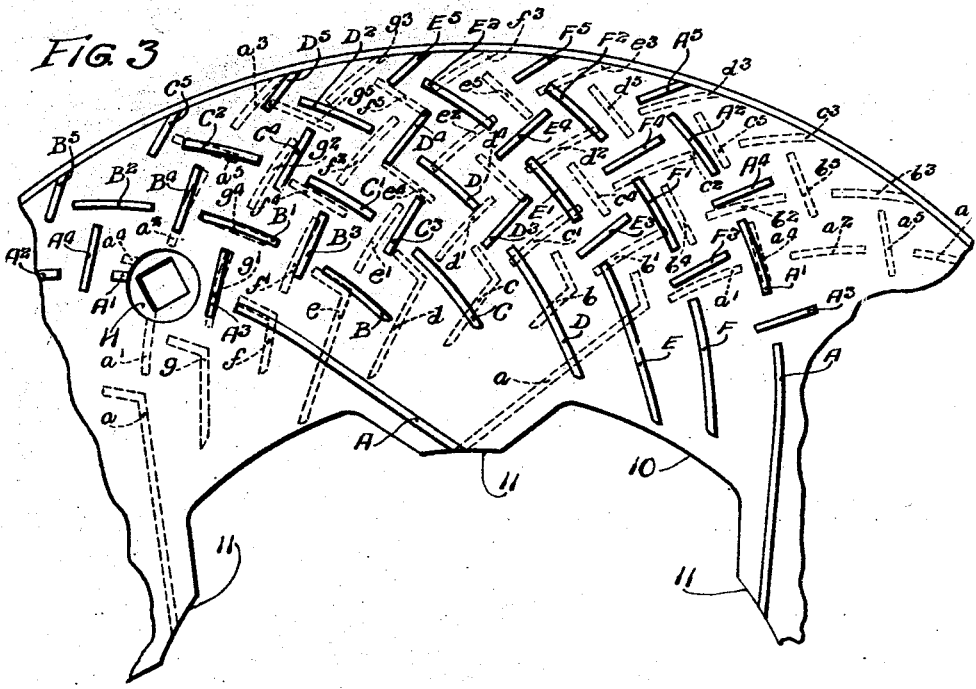
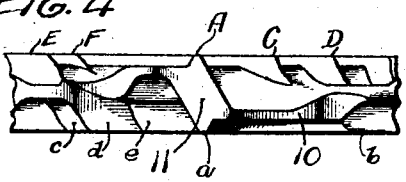
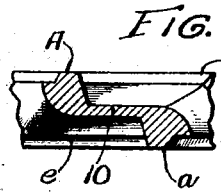
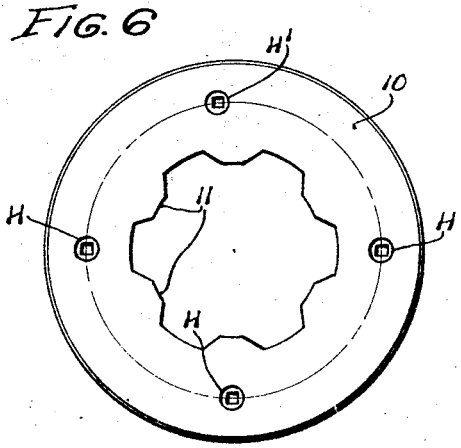

Patented Dec. 7, 1926.

1,609,718

UNITED STATES PATENT OFFICE.

LUDWIG HOLLAND-LETZ, OF CROWN POINT, INDIANA, ASSIGNOR TO THE LETZ MANUFACTURING COMPANY, OF CROWN POINT, INDIANA, A CORPORATION OF INDIANA.

GRINDING BURRS.

Application filed April 6, 1925. Serial No. 20,954.

My invention is concerned with grinding burrs, and more especially with slow-speed burrs in which the feed of the material is not due to the centrifugal force applied to the material being ground, but to the feeding action of the teeth, and it is designed to produce a pair of burrs of the class described in which the shearing edges of the two burrs can be set in direct contact, and the device will still function without clogging, with the result that very fine grinding can be done on all the numerous different materials ground by the farmers who mainly use them.

To this end, I employ a pair of burrs in which the opposed faces are substantially symmetrical except for the relative locations of the feeding ribs or teeth and the shearing teeth, and in which each face has feeding ribs or teeth, preferably curved, directed across the annular surface thereof and set at an angle to any radial lines, so that as it rotates, these feeding ribs or teeth force the material outwardly, and associated with these feeding ribs or teeth are the shearing or snipping teeth, which extend substantially at right angles to the feeding ribs or teeth on the same plate, and are especially designed so that their edges shear against the feeding ribs or teeth of the opposed burr, after which the shearing teeth of the opposed burr co-operate with the feeding ribs or teeth of the first-mentioned burr, and so on, the effect being that there is an alternation in the action of the shearing and feeding teeth of the two burrs, and the shearing teeth of one burr never co-operate directly with the shearing teeth of the other burr, which direct co-operation of the shearing teeth of the two burrs would tend to clog up and choke the grinder, a result that is practically impossible with a pair of burrs constructed in accordance with my invention.

Another feature of my invention resides in constructing burrs, such as are described in the preceding paragraph, with their feeding ribs or teeth divided into sections, instead of extending unbroken across the annular portion of the burr, as they might be constructed under the description of the preceding paragraph.

This dividing of the feeding ribs into sections enables me to make the shearing teeth separate from the feeding ribs or teeth, and to locate them between the adjacent ends of the sections of the feeding teeth or ribs, thus permitting the grain to pass through (as it were) the feeding ribs instead of over them, as is necessary where they are continuous, thus reducing the pressure required to hold the burrs together in operative position, and in effect reducing the power required to operate the grinder equipped with the burrs.

It is further concerned with a pair of burrs in which there are more teeth or ribs on the face of one burr than on the co-operating face of the other one, having, for instance, six groups or sets of teeth in each of the customary six sections, making thirty-six groups in all, while the other has seven groups or sets of teeth in each of the six sections, making forty-two groups in all, the object of this novel arrangement being to prevent all the teeth on one burr co-operating with all the teeth on the other at the same time (thereby throwing a heavy load on the power) and to compel the shearing action to be spread out, so that it is practically continuous instead of strongly intermittent, thereby causing the grinder to run more smoothly and steadily and require the application of less power to it.

It is further concerned with a burr which has both faces covered with feeding and shearing teeth, the patterns of the teeth on the two sides being different and complementary, whereby the burr can be reversed, both faces being designed for use in grinding, and whereby a single burr contains both the complementary patterns which I find it necessary to use.

Finally, it is concerned with such burrs having the complementary patterns of teeth on the two faces, which are provided with bolt holes for securing the plates to their supports, one of which bolt holes is set irregularly with reference to the others, so that there is no possibility of mounting the burrs upon their supports in a position in which the two burrs will not properly register with each other.

To illustrate my invention, I annex hereto two sheets of drawings, in which the same reference characters are used to designate identical parts in all the figures, of which,—

Fig. 1 is a plan view of a portion of one face of the burr embodying my invention;

Fig. 2 is a similar view of the complementary face;

Fig. 3 is a diagrammatic view showing the relation of the teeth of the two complementary faces as superimposed in operation;

Fig. 4 is a detail as seen from line 4—4 of Fig. 1;

Fig. 5 is a detail in section as seen on the line 5—5 of Fig. 1; and

Fig. 6 is a small diagrammatic view illustrating the arrangement of the bolt holes and the general outline of one of the burrs.

In carrying out my invention in its preferred form, I make each face of the annular burr with a plurality, preferably six, of segmental sections of the same size and having the same design in each section. The body of the burr is an annular casting 10, and where the doubleface feature of my invention is employed, it has teeth on both sides of it, and these teeth are preferably of the different complementary patterns on the two sides, although they may be made of the same pattern on both sides, the latter construction, however, having the objection that two distinct patterns of the complete burrs are required, instead of the possible single pattern. Fig. 1 shows a single section of one pattern, while Fig. 2 shows a single section of the co-operating and complementary pattern, the reference letters on one being upper case, while the corresponding reference letters on the other are lower case, for easy understanding of the relationship of the teeth on the two disks.

In Fig. 1, I have shown one side having the six series A, A′, A², A³, A⁴ and A⁵; B, B′, B², B³, B⁴ and B⁵; C, C′, etc.; D, D′, etc.; E, E′, etc., and F, F′, etc., of feeding and shearing teeth, the teeth A, A′ and A²; B, B′ and B²; C, C′ and C²; D, D′ and D²; E, E′ and E², and F, F′ and F² constituting in effect six feeding ribs in each section of the six sections extending substantially across the annular face, and set at such an angle to all the radii that can be drawn across the annulus, that the ribs, as the burr is slowly rotated, force the grain outward by a camming action, as it were, which will operate independently of any centrifugal action, which needs a high speed of rotation to be effective as a feed.

The teeth A³, A⁴ and A⁵; B³, B⁴ and B⁵; C³, C⁴ and C⁵; D³, D⁴ and D⁵; E³, E⁴ and E⁵, and F³, F⁴ and F⁵ extend substantially at right angles to the line of the feeding teeth, and are shearing teeth co-operating, as readily seen in diagrammatic Fig. 3, with the feeding teeth of the complementary burr face. Owing to their extending in a staggered relation between the rows of feeding teeth, these shearing teeth also have the function of forming tortuous passages for the grain as it moves outward so as to slow up its movement and insure a more perfect shearing and grinding action.

On the other face, or its complementary burr, as seen in Fig. 2, I form the teeth $a$, $a'$, $a^2$, $a^3$, $a^4$ and $a^5$; $b$, $b'$, $b^2$, $b^3$, $b^4$ and $b^5$; $c$, $c'$ etc.; $d$, $d'$, etc.; $e$, $e'$, etc.; $f$, $f'$, etc., and $g$, $g'$, etc. and it will be noted that they constitute seven series of feeding and shearing teeth, so that when the two surfaces are brought face to face, as indicated diagrammatically in Fig. 3, where the shearing edges only of the face shown in Fig. 1 are indicated in full lines, while the shearing edges only of the face shown in Fig. 2 are indicated in dotted lines, the fact that there are seven series of teeth on one face and only six series of teeth on the other face causes such a relative displacement of the series of teeth on the two faces that in each section there can only be one pair of the series of teeth actually shearing at a time, so that the resistance offered to the shearing action is spread out so as to produce a practically continuous resistance in the machine, instead of an intermittent one, which necessarily occurs as these co-operating burrs have heretofore been designed. It will also be noted that a further spreading out of the resistance to the shearing action is secured by the fact that the cooperating shearing teeth of one burr are diverging a little from the co-operating feeding teeth of the other burr as they come into register by their relative movement, so that a progressive shearing action is produced between each pair of teeth, just as occurs in using the ordinary hand shears.

It will also be noted that the inner periphery of the burrs is provided with the projections 11 to accommodate the longest teeth A and $a$, and where the double-face construction is employed with the two designs of burr on the two faces, the inner ends of the teeth A are opposite the inner ends of the teeth $a$. This arrangement, as best seen in Figs. 4 and 5, enables me to get an additional depth of metal for the leading face of each of the teeth by employing a very shallow following face for these teeth, the shallow following face, of course, not being objectionable, while the deep leading face of the feeding teeth is essential at their inner ends so as to give a large feeding capacity.

With the construction shown, the burrs are set so that the shearing faces of the feeding ribs or teeth and the shearing teeth of the two burrs are directly in contact, and as a result, all the material will be cut and recut until it is ground fine in passing from the inner periphery to the outer periphery of the burrs.

As previously stated, I preferably employ a set of teeth on each of the two faces of tary burr having similarly arranged alternating series of feeding teeth and shearing teeth, the circles of shearing teeth on one burr registering with the circles of feeding teeth on the other burr.

8. In a grinding machine, the combination of an annular burr having feeding teeth directed across the annular surface at a feeding angle and also having shearing teeth at considerable intervals directed transversely of the feeding teeth, with a complementary burr having similarly arranged feeding teeth and shearing teeth, the feeding teeth of one burr being adapted to coact with the shearing teeth of the other burr, after which the shearing teeth of the first burr coact with the feeding teeth of the second burr, and so on, so that the shearing teeth of each burr coact with the feeding teeth of the other burr, and vice versa, the shearing teeth on one burr being set at such an angle to the feeding teeth of the other burr that when they coact there is a progressive shearing action.

9. As a new and useful article of manufacture, a double-faced annular grinding burr, having its generally circular inner periphery provided with inwardly directed extensions, and with its grinding faces provided with plural series of feeding teeth directed across the same, a tooth in each series being exceptionally long and having its inner end terminating in one of said extensions, there being one of said exceptionally long teeth on both sides terminating in each of the extensions.

10. As a new and useful article of manufacture, a double-faced annular grinding burr having its generally circular inner periphery provided with inwardly directed extensions, and with its grinding faces provided with plural series of feeding teeth directed across the same, a tooth in each series being exceptionally long, there being such exceptionally long feeding teeth on both faces terminating in each of said extensions, the leading side of the inner end of each exceptionally long tooth being much deeper than the following side.

11. As a new and useful article of manufacture, a double-faced annular grinding burr with its grinding faces provided with plural series of feeding teeth directed across the same, a tooth in each series being exceptionally long, there being such exceptionally long feeding teeth on both faces terminating opposite to each other, the leading side of the inner end of each of the exceptionally long teeth being much deeper than the other side.

12. In a grinding machine, the combination of a pair of burrs, each having series of co-operating teeth, there being more teeth on one burr than on the other so that the co-operating shearing action of the various co-operating teeth of the two burrs will be consecutive rather than simultaneous.

13. In a grinding machine, the combination of a pair of burrs, each having plural series of co-operating teeth, there being more teeth in each series on one burr than in the other, so that the co-operating shearing action of the various co-operating teeth of the two burrs will be consecutive rather than simultaneous.

14. In a grinding burr, the combination with a base, of series of feeding teeth extending across the annular face thereof in lines directed at a feeding angle, and series of shearing teeth extending transversely of the lines of feeding teeth and between adjacent ends thereof.

15. In a grinding burr, the combination with a base, of series of feeding teeth extending across the annular face thereof in lines directed at a feeding angle, and series of shearing teeth extending transversely of the lines of feeding teeth and between adjacent ends thereof, the shearing teeth between adjacent lines being so staggered as to produce a tortuous path between each adjacent pair of lines of feeding teeth.

16. In a grinding burr, the combination with a base, of series of feeding teeth extending across the annular face thereof and directed at a feeding angle so that the material will move across the annular surface in lines, and shearing teeth extending transversely of said lines of movement and having the sides facing inward slightly inclined and up which sides the material is forced for shearing when it reaches them, the top surfaces of said feeding and shearing teeth being ground off in the same plane.

In witness whereof, I have hereunto set my hand this 26th day of March, 1925.

LUDWIG HOLLAND-LETZ.

the burr, so that they can be reversed as they become worn, and it will be understood that I might employ on one side of the burr the teeth shown in Fig. 1, and on the other side the teeth shown in Fig. 2, in which case only one design of burr need be employed. Or I might employ the same design on both sides of the burr, in which case two different designs would be necessary, each grinder necessarily employing one of each of the two designs. In order to insure the burrs being properly mounted where there are two different designs on the two faces, instead of having the four bolt holes H spaced apart equidistantly, I locate one of them, H', in an irregular position relative to the other, and it will be understood, of course, that the bolt holes on the supporting members for the burrs are similarly spaced apart, so that it is impossible to get them mounted in an incorrect position.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as my invention, and desire to secure by Letters Patent of the United States, is:

1. In a grinding machine, the combination of an annular burr having feeding teeth directed across the annular surface at a feeding angle and also having shearing teeth at considerable intervals directed transversely of the feeding teeth, with a complementary burr having similarly arranged feeding teeth and shearing teeth, but with the shearing teeth of one burr being located at different distances from the axes of the burrs from those of the shearing teeth of the other burr, so that the shearing teeth of each burr coact with the feeding teeth of the other burr, and vice versa.

2. In a grinding machine, the combination of an annular burr having feeding teeth directed across the annular surface at a feeding angle and also having shearing teeth at considerable intervals directed transversely of the feeding teeth, the shearing teeth projecting from both sides of the axes of the feeding teeth so as to form tortuous passages between adjacent feeding teeth, with a complementary burr having similarly arranged feeding teeth and shearing teeth, but with the shearing teeth of one burr being located at different distances from the axes of the burrs from those of the shearing teeth of the other burr, so that the shearing teeth of each burr coact with the feeding teeth of the other burr, and vice versa.

3. In a grinding machine, the combination of an annular burr having feeding teeth directed across the annular surface at a feeding angle and also having shearing teeth at considerable intervals directed transversely of the feeding teeth, with a complementary burr having similarly arranged feeding teeth and shearing teeth, but with the shearing teeth of one burr being located at different distances from the axes of the burrs from those of the shearing teeth of the other burr, so that the shearing teeth of each burr coact with the feeding teeth of the other burr, and vice versa, the shearing teeth of the burrs projecting to both sides of the axes of the feeding teeth and those associated with adjacent lines of feeding teeth being staggered in their relationship so as to form a tortuous passage between adjacent feeding teeth.

4. In a grinding machine, the combination of an annular burr having feeding teeth directed across the annular surface at a feeding angle and also having shearing teeth at considerable intervals directed transversely of the feeding teeth, with a complementary burr having similarly arranged feeding teeth and shearing teeth, but with the shearing teeth of one burr being located at different distances from the axes of the burrs from those of the shearing teeth of the other burr, so that the shearing teeth of each burr coact with the feeding teeth of the other burr, and vice versa, said burrs being provided with engaging means for securing them to their supports, one of said engaging means being positioned asymmetrically relative to the other engaging means so that the burrs can be secured to their supports in only one position.

5. As a new and useful article of manufacture, a double-faced grinding burr having an annular base from both faces of which project feeding teeth and shearing teeth, the shearing teeth on one face being complementary to the feeding teeth on the other face so that if two such burrs be associated with their complementary faces adjacent, the shearing teeth of one burr cooperate with the feeding teeth of the other burr, and vice versa.

6. As a new and useful article of manufacture, a double-faced grinding burr having an annular base from both faces of which project feeding teeth and shearing teeth, the shearing teeth on one face being adapted to co-operate with the feeding teeth on the other face of a complementary burr mounted to co-operate therewith, and the shearing teeth on the two sides being spaced at different distances from the center.

7. In a grinding machine, the combination of an annular burr having thereon circles of feeding teeth directed across the annular surface at a feeding angle alternating with circles of shearing teeth directed transversely of the feeding teeth, with a complemen-